United States Patent [19]

Marinus et al.

[11] Patent Number: 5,032,967
[45] Date of Patent: Jul. 16, 1991

[54] SMPS APPARATUS HAVING A DEMAGNETIZATION CIRCUIT

[75] Inventors: Antonius A. M. Marinus; Guy L. P. De Bondt, both of Eindhoven, Netherlands

[73] Assignee: U.S. Philips Corporation, New York, N.Y.

[21] Appl. No.: 478,791

[22] Filed: Feb. 12, 1990

[30] Foreign Application Priority Data

Mar. 2, 1989 [NL] Netherlands ............... 8900509

[51] Int. Cl.$^5$ ............................. H02M 3/335
[52] U.S. Cl. ............................. 363/21; 363/97
[58] Field of Search ............ 363/18, 19, 20, 21, 363/95, 97

[56] References Cited

U.S. PATENT DOCUMENTS

| | | | |
|---|---|---|---|
| 4,564,820 | 1/1986 | Peruth et al. | 363/97 |
| 4,593,347 | 6/1986 | Peruth et al. | 363/21 |
| 4,597,036 | 6/1986 | Paulik et al. | 363/97 |
| 4,608,625 | 8/1986 | Josephson et al. | 363/21 |
| 4,648,016 | 3/1987 | Peruth et al. | 363/97 |
| 4,688,159 | 8/1987 | Marinus | 363/19 |
| 4,694,385 | 9/1987 | Marinus | 363/18 |
| 4,766,528 | 8/1988 | Marinus | 363/19 |
| 4,794,508 | 12/1988 | Carroll | 363/95 |

FOREIGN PATENT DOCUMENTS

| | | |
|---|---|---|
| 0139226 | 9/1984 | European Pat. Off. . |
| 0155369 | 12/1984 | European Pat. Off. . |
| 3226213 | 1/1984 | Fed. Rep. of Germany . |
| 8607214 | 12/1986 | World Int. Prop. O. . |

Primary Examiner—Steven L. Stephan
Assistant Examiner—Jeffrey Sterrett
Attorney, Agent, or Firm—Bernard Franzblau

[57] ABSTRACT

A switched mode power supply circuit includes a controllable switch in series with an inductive element between the terminals of a DC input voltage. A control circuit renders the switch alternately conductive and non-conductive. A rectifier for deriving a DC output voltage is coupled to the inductive element. To prevent the inductive element from becoming saturated, a switching element is coupled to the control circuit for maintaining the controllable switch in its blocked state only during a time interval which immediately follows an interval of conductance of the controllable switch and during which the voltage across the inductive element has the same polarity as when the rectifier is conductive.

19 Claims, 3 Drawing Sheets

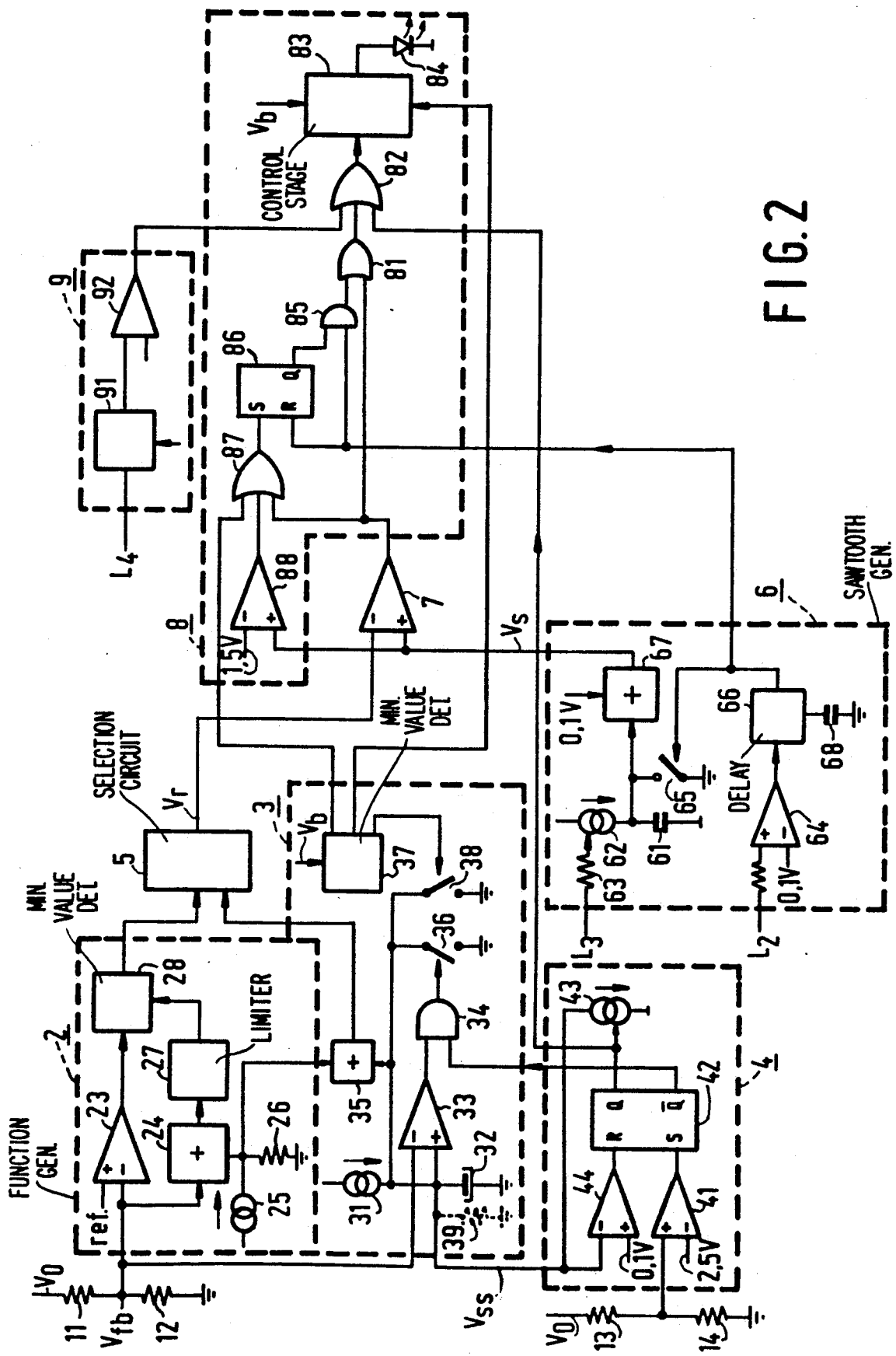

SMPS APPARATUS HAVING A DEMAGNETIZATION CIRCUIT

BACKGROUND OF THE INVENTION

This invention relates to a switched-mode power supply circuit comprising a series arrangement of a controllable switch and an inductive element coupled between the terminals of a DC input voltage, a rectifier coupled to the inductive element for making a DC output voltage available at a load connected thereto and a control circuit for rendering the switch alternately conductive and non-conductive, the voltage across the inductive element having a given polarity when the rectifier is conductive.

A power supply circuit of this type is known from European Patent Specification 155,369. This known power supply has a circuit for preventing the inductive element from being saturated. For this purpose the magnetic flux in the inductive element is measured and the conductivity time of the controllable switch is controlled by the measuring signal obtained such that the flux remains at an admissible level. The circuit for this power supply is rather complicated.

SUMMARY OF THE INVENTION

It is an object of the invention to provide a power supply circuit of the type described above in which the saturation of the inductive element is prevented in a simpler manner than in the known power supply circuit. To this end a switched-mode power supply circuit according to the invention is characterized by a switching element coupled to the control circuit for maintaining the controllable switch in its blocked state only during a time interval which immediately follows an interval of conductance of the said switch and during which the voltage across the inductive element has the said polarity.

The invention is based on the following recognition. In a time interval in which the controllable switch is blocked, a demagnetizing current for the inductive element flows through the rectifier. If in this interval the switch were rendered conducting again, for example, under the influence of a control of the conductivity time of the switch for maintaining the output voltage constant, the said element could not be discharged and might consequently become saturated. Due to the measure according to the invention, the switch is maintained in its blocked state after the voltage across the inductive element has had the polarity which corresponds to the conductance of the rectifier and after the switch has been conducting for causing a magnetizing current to flow through the inductive element. An instability, which could otherwise be produced because ringing effects might occur which are caused by the inductance of the transformer and by parasitic capacitances, then does not occur. The circuit means for the measure according to the invention are fairly simple and can be integrated.

The circuit is advantageously characterized in that the switching element is a bistable element, comprising means for applying a set signal to a set input of the bistable element so as to bring this element to a first state for maintaining the controllable switch blocked, a threshold voltage detector being coupled to the inductive element for applying a reset signal to a reset input of the bistable element so as to bring this element to a second state for rendering and maintaining said controllable switch conducting, said detector being operative when the voltage across the inductive element exceeds a predetermined threshold value. As a result, a usable distinction is made between the two possible states of the switch.

The demagnetization protection will be operative in a satisfactory way in the case where a number of windings is coupled to the inductive element if the threshold voltage detector is connected to the winding having the largest number of turns.

The power supply circuit is preferably characterized in that an adjustable delay element for delaying the reset signal applied to the reset input of the bistable element is coupled between the threshold voltage detector and the said input. As a result, conduction of the controllable switch is prevented at the start of a blocking interval, i.e., while ringing effects occur which are caused by parasitic capacitances and leakage inductances so that under given circumstances the voltage across the inductive element could become zero and could subsequently assume the other polarity.

BRIEF DESCRIPTION OF THE DRAWINGS

The invention will be described in greater detail by way of example with reference to the accompanying drawings, in which FIG. 2 shows some details of the circuit diagram of FIG. 1.

DESCRIPTION OF THE PREFERRED EMBODIMENTS

Figure 1:
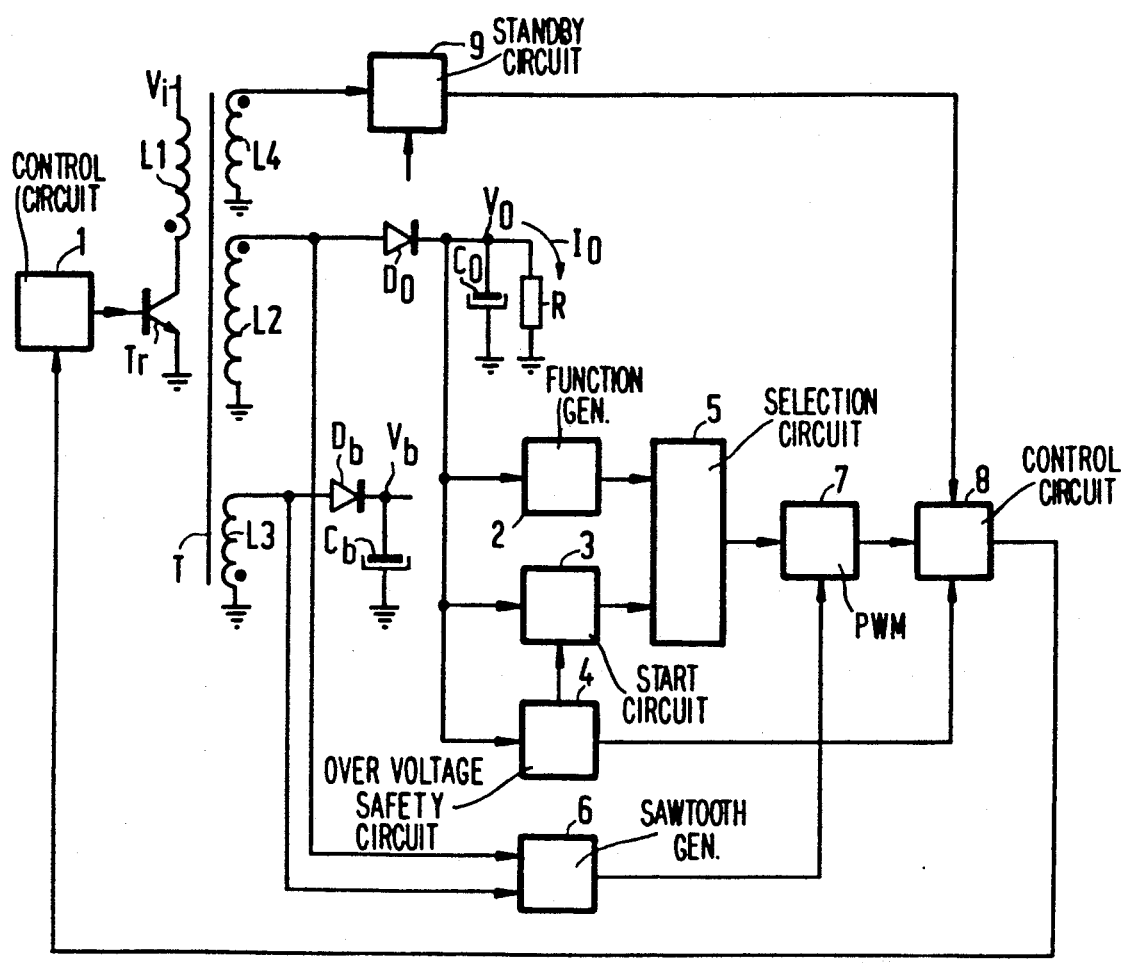
FIG. 1 is a block-schematic diagram of the power supply circuit according to the invention.

The power supply circuit of FIG. 1 comprises a controllable switch in the form of an NPN switching transistor Tr whose collector is connected to the primary winding L1 of a transformer T and whose emitter is connected to ground. The other end of winding L1 is connected to the positive terminal of a DC input voltage source $V_i$ whose negative terminal is also connected to ground and which is, for example, a mains rectifier. The base lead of transistor Tr is connected to a control circuit 1 for turning the transistor alternately on and off.

Transformer T has a plurality of secondary windings. One of these windings, L2, has one end connected to ground. The other end is connected to the anode of a rectifier $D_o$ whose cathode is connected to a smoothing capacitor $C_o$ and to a load represented by a resistor R. The terminals of capacitor $C_o$ and resistor R which are not connected to rectifier $D_o$ are connected to ground. The winding sense of windings L1 and L2, which is conventionally denoted by dots, as well as the direction of conductivity of rectifier $D_o$ are chosen so that, in operation, a current flows through the one winding while the other is currentless. A DC output voltage $V_o$ is present across the load R. The said elements form part of a switched-mode power supply circuit of known type, in which the control of the duration of the time intervals in which transistor Tr is turned on ensures that the voltage $V_o$ has a substantially constant value which is independent of the values of the voltage $V_i$ and of load R. The circuit of FIG. 1 may be, for example, a supply circuit for a television receiver. The loads on the secondary windings of transformer T are formed by the power consumption of a plurality of circuits in the receiver. A current flows through one of these windings, L3, during the same period when a current flows through winding L1.

The output voltage $V_o$ is applied to a function generator 2, to a starting circuit 3 and to a safety circuit 4. The outputs of generator 2 and circuit 3 are connected to a selection circuit 5. Windings L2 and L3 are connected to a sawtooth generator 6. The sawtooth-shaped signal generated thereby and an output signal from selection circuit 5 are applied to a pulse duration modulator 7, an output signal of which is applied to a control circuit 8. A secondary winding L4 of transformer T is connected to a stand by circuit 9. Circuit 9 has its output coupled to stage 8 in turn and stage 8 is coupled to control circuit 1.

FIG. 2 shows the details of the power supply circuit of FIG. 1. The series arrangement of two resistors 11 and 12 is connected between a voltage $V_o$ and ground. The function generator 2 comprises a differential amplifier 23, an inverting input of which is connected to the junction point of the resistors. This point conveys a voltage $V_{fb}$ which is proportional to voltage $V_o$. In another embodiment the voltage divider 11, 12 may be dispensed with. An input of an adder stage 24 is connected to the same point. A current source 25 is connected to another input of stage 24 and a resistor 26 is arranged between this input and ground. A reference voltage is connected to a non-inverting input of amplifier 23. The difference between the negative feedback voltage $V_{fb}$ and the reference voltage is amplified by amplifier 23 and stage 24 adds voltage $V_{fb}$ to the voltage produced by source 25 across resistor 26. The sum voltage obtained at an output of stage 24 is applied to a limiter 27. The voltage thus obtained and the voltage which is present at an output of amplifier 23 are applied to a minimum value transmission circuit 28. This circuit passes on the lowest of said voltages to the selection circuit 5. Circuit 5 also receives a voltage which originates from the starting circuit 3. Circuit 5 is also a minimum value transmission circuit so that the lowest of the two input voltages to circuit 5 is passed on to an inverting input of the modulator 7, formed as a differential amplifier, for controlling the modulator as a function of the output voltage $V_o$. In the normal operating condition of the power supply circuit the voltage at the output of circuit 28 is always lower than the voltage which originates from the start circuit 3, so that the first-mentioned voltage is passed on to selection circuit 5. In practice such a minimum value transmission circuit can be formed by means of two emitter-coupled PNP transistors whose bases are connected to the respective voltages to be compared, the lowest of these voltages turning on the associated transistor.

Figure 3A:
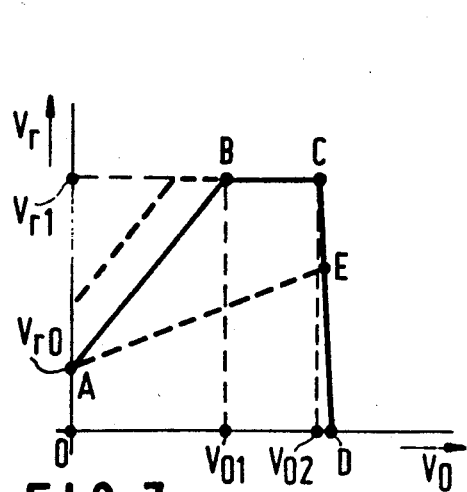
FIG. 3 shows diagrams relating to the circuit.

A solid line in FIG. 3a denotes the transfer characteristic of elements 2 and 5, i.e. the diagram of the variation of the voltage $V_r$ passed on by circuit 5 as a function of voltage $V_o$ in the case where the starting circuit 3 is not operative. If voltage $V_o$ is zero, voltage $V_r$ has a given value $V_{ro}$ which can be set by means of elements 25 and 26 (point A in FIG. 3a). The characteristic curve is linear up to a given value $V_{r1}$ which is reached for $V_o = V_{o1}$ (point B). If the voltage $V_o$ is higher than $V_{o1}$, limiter 27 becomes operative, resulting in the voltage $V_o$ no longer increasing. At values of voltage $V_o$ which are lower than a value $V_{o2}$ (point C), which is higher than $V_{o1}$, the voltage at the output of amplifier 23 is higher than the voltage of limiter 27, so that circuit 5 further passes on the last-mentioned voltage. At values of voltage $V_o$ which are higher than $V_{o2}$ the voltage at the output of amplifier 23 is lower than that of limiter 27, so that the voltage at the amplifier output is further passed on. This voltage decreases very steeply at increasing values of voltage $V_o$ and becomes zero at a point D.

The sawtooth generator 6 includes a capacitor 61 which is charged by a current source 62. The value of the current of source 62 is determined by a resistor 63 which is connected to winding L3. Since winding L3 conveys a current simultaneously with winding L1, source 62 is operative during the interval of conductance of transistor Tr. The voltage of winding L2 is compared with a reference voltage of, for example, 100 mV by means of a differential amplifier 64. If the voltage across winding L2 exceeds this value, which takes place during the period when transistor Tr is turned off, a switch 65 arranged parallel to capacitor 61 becomes conductive so that the capacitor is discharged. The starting instant of charging is delayed by means of a delay element 66. The reason for this will be explained hereinafter. Under these circumstances a sawtooth-shaped voltage, whose peak value is a measure of the peak value of the collector current of transistor Tr and of the value of the voltage $V_i$, is produced across capacitor 61. A voltage of approximately 100 mV is added to the sawtooth by means of an adder stage 67 and the voltage $V_s$ obtained is applied to a non-inverting input of amplifier 7. In another embodiment the sawtooth generator may be an oscillator.

In operation amplifier 7 compares the output voltage $V_r$ passed on by the selection circuit 5 to the control input of the amplifier with the voltage $V_s$. The control circuit 8 has an OR gate 81, an input of which is connected to an output of amplifier 7. Via a second OR gate 82 the output signal of amplifier 7 reaches a control stage 83 which drives a light-emitting diode 84. Diode 84 is optically coupled to a photosensitive element which forms part of the control circuit 1 of transistor Tr. At an instant when voltage $V_r$ is lower than $V_s$, the output signal of amplifier 7 is high so that diode 84 conveys a current. Circuit 1 is adapted in a known manner so that transistor Tr is then turned off. However, at an instant when voltage $V_r$ is higher than $V_s$, transistor Tr is turned on. The lower the voltage $V_r$ with respect to voltage $V_s$, the shorter the conductivity time of transistor Tr, and conversely. As a result, a control of voltage $V_o$ is obtained. If, for example, the load decreases, voltage $V_o$ increases. Voltage $V_r$ decreases (line section CD in FIG. 3a). As a result, diode 84 starts conducting at an earlier instant than would otherwise be the case so that transistor Tr is turned off at an earlier instant. The peak value of the collector current decreases. The energy stored in transformer T during the conductivity time of the transistor decreases, which counteracts the increase of voltage $V_o$. At a larger load the opposite applies, i.e. the conductivity time of transistor Tr increases. If voltage $V_i$ increases, so that voltage $V_o$ would otherwise increase, voltage $V_s$ also increases, resulting in the said conductivity time becoming shorter, which stabilizes $V_o$.

Figure 3B:
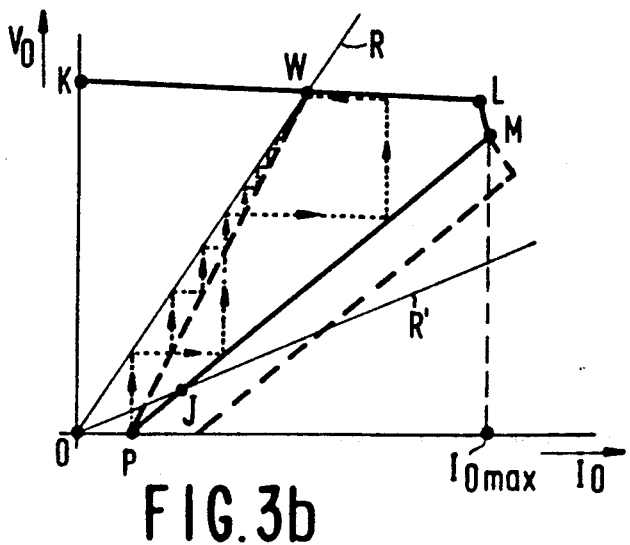

A solid line in FIG. 3b shows the output characteristic of the power supply circuit, i.e. the diagram of the variation of the output voltage $V_o$ as a function of the output current $I_o$ flowing through the load R. The characteristic has a given shape due to the fact that voltage $V_r$ has the variation shown in FIG. 3a as a function of the voltage $V_o$. The characteristic of FIG. 3b is a substantially horizontal straight line between the current value 0 and a given value of current $I_o$ (between points K and L in FIG. 3b). At higher values of the current the voltage slightly decreases, while the current slightly increases and reaches a maximum value $I_{omax}$ (point M), whereafter both the voltage and the current decrease steeply. The characteristic is then a substantially straight line reaching the $I_o$ axis at a point P which corresponds to a low value of $I_o$, i.e. the value at a short-circuited load ($V_o=0$). Such a characteristic is known under the name of current fold-back characteristic. The diagrams of FIGS. 3a and b correspond to each other, more specifically such that point A corresponds to point P, B corresponds to M, C corresponds to L and D corresponds to K. FIG. 3b also shows the straight line representing resistor R at the nominal value of this resistor. This line intersects the line section KL at a point W which represents the nominal working point and which corresponds to a point E located on the line section CD in FIG. 3a. The control of the period of conductance of transistor Tr implies that, in operation, the working point is displaced along the line section KL around point W. A straight line, which would have been drawn between the origin 0 of the system of coordinates and point L, indicates the minimum value of resistor R. Point A determines the minimum period of conductance of transistor Tr in the case of a short-circuited output and its setting influences both characteristics: this is denoted in FIG. 3 by means of broken lines in accordance with a line running parallel to the solid lines AB and MP, respectively. The maximum value of the collector current of the transistor is determined by means of limiter 27 and therefore the maximum value of voltage $V_r$ and of current $I_o$ is determined. It is achieved by means of stage 67 that the level of voltage $V_r$ may be lower than voltage $V_s$, for example, in unloaded operation at which it must be possible for the working point to be displaced to point D, i.e. the point for which the period of conductance of transistor Tr is zero.

The starting circuit 3 comprises a current source 31 for charging a storage element in the form of a capacitor 32. The junction point of elements 31 and 32 is connected to a non-inverting input of a differential amplifier 33, an inverting input of which is connected to the junction point of resistors 11 and 12. An output of amplifier 33 is connected to an input of an AND gate 34. An input of an adder stage 35 is connected to the junction point of elements 25 and 26, another input is connected to the junction point of elements 31 and 32 and an output is connected to the second input of circuit 5. An output of gate 34 operates a switch 36 arranged parallel to capacitor 32.

Circuit 4 is an overvoltage protection circuit. The voltage at the junction point of two resistors 13 and 14, which are arranged in series between the voltage $V_o$ and ground, is compared with a reference voltage of, for example, 2.5 V by means of a differential amplifier 41. An output of amplifier 41 is connected to a set input of a flip-flop 42. A non-inverting output Q of flip-flop 42 controls a discharge current source 43 for capacitor 32 and is connected to a second input of gate 82. An inverting output $\overline{Q}$ of flip-flop 42 is connected to a second input of gate 34. The voltage across capacitor 32 is compared with a reference voltage of, for example, 100 mV by means of a differential amplifier 44 and an output of amplifier 44 is connected to a reset input of flip-flop 42.

In the normal operating condition of the power supply the voltage at the junction point of resistors 13 and 14 is lower than approximately 2.5 V. The signal applied by flip-flop 42 to gate 34 is a 1, while source 43 is inoperative. If the voltage $V_{ss}$ generated by source 31 across capacitor 32 is higher than voltage $V_{fb}$, switch 36 starts conducting so that the capacitor is quickly discharged. Voltage $V_{ss}$ decreases. In the opposite case the switch is blocked so that the said voltage increases. It is apparent therefrom that voltage $V_{ss}$ is always clamped at substantially the value of voltage $V_{fb}$. This value is substantially constant in the normal operating condition and it is higher than the voltage applied by generator 2 to circuit 5 and therefore has no influence on the control of the output voltage. A resistor 39, shown in broken lines, may be arranged parallel to capacitor 32. The voltage across the capacitor is thereby decreased to the value of the voltage drop produced by source 31 across the resistor. The resistor can be chosen so that the voltage applied by stage 35 to circuit 5 is the lowest of the input voltages of this circuit so that transistor Tr is turned off at an earlier instant than would otherwise be the case. It is apparent therefrom that the provision of the said resistor ensures that the peak value of the collector current of the transistor can be set to a given value by means of the starting circuit 3.

When switching on the television receiver of which the described power supply circuit forms a part, all voltages are initially zero. The voltage at the output of amplifier 23 becomes high. A voltage drop is produced across resistor 26 by source 25 and is added to the slowly increasing voltage across capacitor 32 by means of stage 35. The said voltage drop determines the minimum period of conductance of transistor Tr via circuit 5, in which period energy is applied to transformer T. The output voltages of the power supply thus increase. A minimum value detector 37 compares a direct voltage $V_b$, which is derived from winding L3 by means of a rectifier $D_b$ and which is present across a smoothing capacitor $C_b$ (FIG. 1), with a reference value of, for example, 6 V. As long as voltage $V_b$ is lower than this value, stage 83 is blocked by detector 37, which makes a soft start possible. Source 31 charges capacitor 32 so that voltage $V_{ss}$ increases slowly, i.e. more slowly than the voltage at the output of generator 2 so that the voltage applied by circuit 3 to circuit 5 is lower than the voltage of generator 2. The voltage of circuit 3 is passed on as the voltage $V_r$ by circuit 5 to modulator 7 so that the period of conductance of transistor Tr slowly increases. The said period of conductance is shorter than would be the case under the influence of the output voltage of generator 2. The rate at which voltage $V_{ss}$ increases is set by the choice of the capacitance of capacitor 32. The normal operating condition starts as soon as the voltage applied by stage 35 to circuit 5 exceeds the voltage applied by circuit 28 to circuit 5, which takes place when $V_o$ has reached the value $V_{o2}$, in which state the voltage of the function generator 2 is passed on by the selection circuit 5 to modulator 7 for controlling the duration of the period of conductance of transistor Tr, while voltage $V_{ss}$, which no longer has any influence on the said duration, remains substantially constant. In FIG. 3 the characteristic curve of the starting circuit is plotted in broken lines AE and PW, respectively.

Voltage $V_b$ is the supply voltage of an integrated circuit comprising most parts of the circuit of FIG. 2. It will be noted that the value of voltage $V_b$, which is derived from winding L3, is not dependent on the value of $V_o$, but on that of $V_i$, more specifically because the integrated circuit must also be active in the case of a short-circuited voltage $V_o$. If in operation voltage $V_b$ becomes lower than 5 V, at which value the integrated circuit cannot function properly, diode 84 remains currentless and transistor Tr is continuously conducting, resulting in the transistor being damaged. This is avoided because the control circuit 1 has a facility for releasing the control of the transistor when the voltage $V_b$ is higher than 6 V. Capacitor 32 is also reset because a switch 38, which is arranged parallel to switch 36, becomes conductive under the influence of detector 37.

If the voltage $V_o$ becomes considerably lower than the value in the normal operating condition, voltage $V_{fb}$ decreases proportionally. Voltage $V_{ss}$ decreases accordingly to the value of $V_{fb}$ so that the voltage at the output of stage 35 becomes lower than that of generator 2 and is thus passed on to modulator 7. This condition occurs in the case of an overload at which resistor R assumes a smaller value R' such that the load line in FIG. 3b intersects the characteristic curve at a working point J which is located on the line section MP. However, if voltage $V_o$ increases to such an extent that the protection level at the junction point of resistors 13 and 14 becomes higher than 2.5 V, flip-flop 42 is set. A 1 is present at the output Q of flip-flop 42 so that source 43 becomes active and discharges capacitor 32 slowly. Voltage $V_{ss}$ decreases. Simultaneously gate 34 is blocked by a 0 at the output $\bar{Q}$ so that switch 36 is not operated. Voltage $V_o$ does not have any influence on the starting circuit. Otherwise voltage $V_{ss}$ would be equal to $V_{fb}$ and the discharge of capacitor 32 would be influenced by the load current. Stage 83 is controlled by flip-flop 42 via gate 82 for causing diode 84 to conduct continuously and thus for turning off transistor Tr. Both in the case of an overload and in the case of the overvoltage the starting voltage $V_{ss}$ is low. At the instant when voltage $V_{ss}$ becomes lower than 100 mV, flip-flop 42 is reset by amplifier 44 so that the discharge of capacitor 32 is discontinued, while gate 34 again receives a 1 and transistor Tr is released. A new start can then begin.

The stand-by circuit 9 comprises a stage 91 which is connected to winding L4 and which ensures, under the influence of a switching signal, that the output voltages of the power supply are decreased considerably. Stage 91 is connected to a comparison stage 92, an output of which is connected to a third input of gate 82. In the stand-by state a periodically interrupted oscillation is generated at a low frequency (burst mode). Such a circuit is described in Netherlands Patent Application 8502338, which corresponds to U.S. Pat. No. 4,688,159 (8/18/87), and which is herein incorporated by reference. If the voltage across winding L4 exceeds a given level, diode 84 conducts so as to turn off transistor Tr so that the said voltage decreases again. If under these circumstances another level is reached which is lower than the first-mentioned level, stage 83 is again blocked so as to turn on transistor Tr.

If an overload occurs at an instant during the period of conductance of transistor Tr, energy, which cannot immediately disappear, is present in transformer T at that instant. The working point follows the characteristic curve along the points L and M and the line section MP towards the new position J. If the overload occurs at an instant during the period when the transistor is turned off, the transformer has no or little energy at that instant so that in order to reach point J the working point follows a path shorter than the characteristic curve. Also in the case of an overvoltage and when setting the stand-by state the working point is displaced to a point located on the line section PM of the characteristic curve in the vicinity of point P. In all these cases the power supply remains operative in the normal manner, albeit that the output voltage and the output current have low values. Since voltage $V_{ss}$ is always clamped at the value of the voltage $V_{fb}$, a soft start is created at which the output voltages of the power supply increase gradually until the nominal position W on the characteristic curve is reached again, unless the disturbance or the stand-by state occurs again. It is apparent therefrom that small and short-lasting disturbances cannot render the supply inactive for a long time. If, for example, the overload is a short circuit of the voltage $V_o$, the working point is located at point P. If the short circuit is eliminated, at which the load is again formed by resistor R, the current $I_o$ initially flowing therethrough produces a voltage drop which is denoted in FIG. 3b by a broken vertical line between point P and the load line representing R. The point of intersection formed on the characteristic curve PW of the starting circuit corresponds to a point which is denoted by a horizontal line. This new point yields a new value of current $I_o$. It is apparent therefrom that the working point is displaced along a staircase-shaped curve and reaches point W without large values of current $I_o$ occurring. The same applies to the start after switching on the receiver, at which the working point reaches the position W from point O. Both in FIG. 3a and in FIG. 3b the working point follows a path shorter than the original characteristic curve. For the purpose of comparison FIG. 3b shows as a dotted line the staircase shape along which the working point would be displaced without the starting circuit, which staircase shape reaches the line section PM. The last vertical line of this staircase shape, the third line in the Figure, intersects the line section KL in the characteristic curve at a point which is located to the right of point W and which represents a situation with a larger output current. Under circumstances the maximum value $I_{o max}$ can be reached. After reaching the line section KL the control is activated so that the working point is no longer displaced along the vertical line but moves to the left along the line section KL until it assumes the position W. It will be clear that the dissipation is then larger than is the case due to the starting circuit.

The operation of the power supply circuit is improved by the delay element 66 referred to hereinbefore and by parts of the control circuit 8 which will now be described. Firstly, an AND gate 85 is concerned, an output of which is connected to a second input of the OR gate 81. An input of gate 85 is connected to a non-inverting output Q of a flip-flop 86. The output of element 66, which controls switch 65, is connected to a reset input of flip-flop 86 and to another input of gate 85. Connected to a set input of flip-flop 86 is the output of an OR gate 87, a first input of which is connected to the output of modulator 7, a second input is connected to an output of a differential amplifier 88 and a third input is connected to detector 37. The output of stage 67 is connected to a non-inverting input of amplifier 88 and an inverting input of this amplifier is connected to a reference voltage of, for example, 1.5 V.

During the time interval in which the switching transistor Tr is turned off, decreasing currents flow through a plurality of secondary windings of transformer T, in this embodiment L2 and L4. The transformer is demagnetized thereby. If the transistor were turned on again in this interval, it would not be possible for the transformer to be discharged and it might consequently become saturated. This is undersirable. The control of the transistor must therefore be such that the transistor Tr is not turned on again before the secondary current has become zero. A usable measure in this case is the fact that the voltage across a secondary winding quickly assumes a given polarity after transistor Tr is turned off, for example, the voltage becomes positive across winding L2 and this polarity is maintained as long as the rectifier connected thereto is conducting and passes the demagnetizing current, whereafter the said voltage decreases, becomes zero and then negative. If the transistor is still turned off, there is the difficulty that ringing effects may occur which are caused by the inductance of the transformer and by parasitic capacitances so that the said voltage may be positive without this situation involving a demagnetization. An instability may be produced if no distinction is made in the control of the transistor between the intervals in which demagnetization and those in which oscillation takes place.

Figure 4:
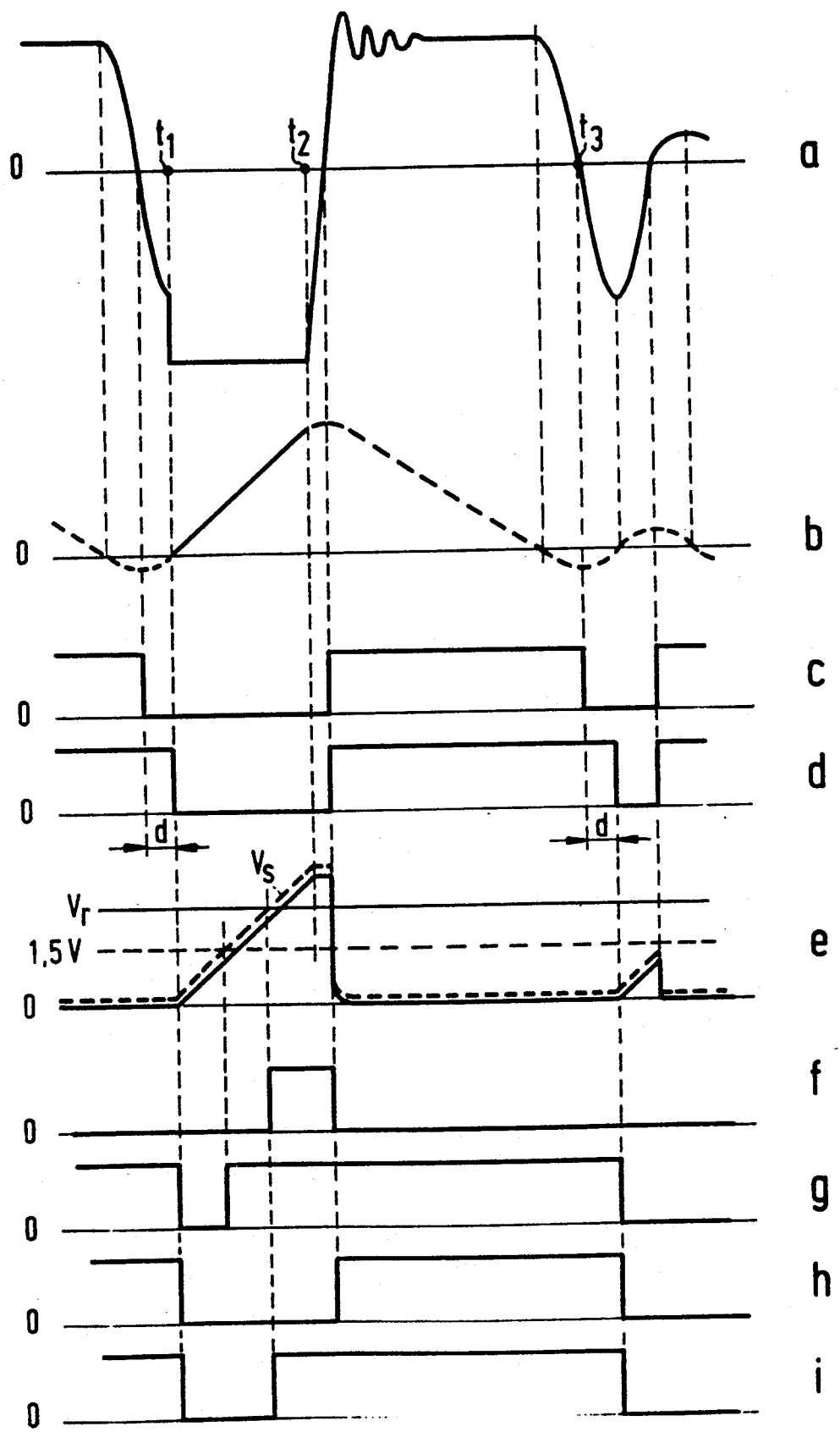
FIG. 4 shows waveforms occurring in the circuit.

The measures taken for this purpose are elucidated with reference to the diagrams of FIG. 4 which are also useful for clarifying the foregoing description. These diagrams apply to the case of a power supply circuit tuned by a capacitor arranged parallel to transistor Tr. FIG. 4a shows the secondary voltage as a function of time. In FIG. 4b the collector current of transistor Tr is denoted by a solid line and the secondary current transformed to the primary side is denoted by a broken line. The transistor is turned on between instants $t_1$ and $t_2$. It is apparent from these diagrams that only the secondary current flowing between instant $t_2$ and the first zero-crossing of the secondary voltage at instant $t_3$ is demagnetizing and that an oscillation occurs after $t_3$.

Amplifier 64 fixes the instants when the voltage across winding L2 does not become zero, but exceeds the value 100 mV so as to make a distinction between the rest state, in which this voltage is zero, and the state with a short-circuited output voltage in which diode $D_o$ conducts with a voltage drop of several tenths of one Volt thereacross. If the voltage across winding L2 is higher than 100 mV, the signal at the output of amplifier 64 becomes high (FIG. 4c). The falling edges of this signal, which occur when this voltage becomes lower than 100 mV, are delayed by means of element 66 having a delay d set by means of a capacitor 68. The falling, delayed edges of the signal obtained at the output of element 66 (FIG. 4d) are applied to flip-flop 86 for resetting this flip-flop and to switch 65 for rendering this switch non-conducting. In FIG. 4e a solid line denotes the sawtooth-shaped voltage generated across capacitor 61 and a broken line denotes voltage $V_s$. The output signal of modulator 7 is shown in FIG. 4f. Without amplifier 88 the rising edges of this signal would set flip-flop 86. The diagram of FIG. 4g represents the signal at the output Q of flip-flop 86 and the diagrams of FIGS. 4h and 4i represent the signal at the output of gate 85 and the signal at the output of gate 81.

It is apparent from the diagrams of FIG. 4 that diode 84 is blocked at the instant $t_1$ which is determined by the delay d, so that transistor Tr is turned on. At the instant when $V_r$ and $V_s$ cross each other in FIG. 4e, diode 84 becomes conducting again. After this instant the transistor is turned off at instant $t_2$ after an interval which is determined by the storage time of the transistor and by delays which may be caused by the control process. After transistor Tr has been turned off, ringing effects may be produced which are caused by leakage inductances and parasitic capacitances. As a consequence thereof the secondary voltage (FIG. 4a) does not immediately assume the value $V_o$ but oscillates around this value. At a low value of voltage $V_o$ the first of these oscillations might come below zero so that the signal of FIG. 4c would have a falling edge and transistor Tr would be turned on. This is prevented in that this edge is delayed by means of element 66. Similarly, the transistor would be turned on at the instant $t_3$, i.e. during the negative voltage swing (FIG. 4a). The signal of FIG. 4i ensures that this is not effected until after the delay d. The reversal in polarity of the voltage of the inductive element at time $t_3$, i.e. subsequent to the flyback interval between $t_2$ and $t_3$, controls the switching element which in turn allows the controllable switch Tr to conduct again. An improvement of the described facilities for demagnetization protection is that the information applied to amplifier 64 about the secondary voltage originates from the secondary winding, in this example L2, which has the largest number of turns.

The properties of the power supply during the start are improved in that the demagnetizing signal from element 66 activates stage 83 only if flip-flop 86 is set, which is effected via gate 87 if the output signal of modulator 7 is positive, or if voltage $V_s$ is higher than 1.5 V, which is established by means of amplifier 88, or if detector 37 supplies the information that voltage $V_b$ is not lower than 5 V. The latter two criteria are added to guarantee demagnetization if transistor Tr does not convey enough base current during the start so that the sawtooth in FIG. 4e does not reach the level $V_r$ and modulator 7 does not yet supply a signal for setting flip-flop 86. FIG. 4g shows that the flip-flop is set at the instant when voltage $V_s$ exceeds the value 1.5 V.

A plurality of parts of the power supply of FIG. 1 has extensively been described in the foregoing. It will be evident that many modifications are possible within the scope of the invention. For example, the type of power supply, for example, self-oscillating or not self-oscillating, constant switching frequency or no constant switching frequency, tuned or not tuned are irrelevant to the invention. The same applies to the switching element used and to a number of details in FIG. 2, for example the generation of the sawtooth which may also be effected at the primary side if a DC separation is not required, for example, with the aid of an emitter-resistor of transistor Tr.

We claim:

1. A switched-mode power supply circuit comprising: a series arrangement of a controllable switch and an inductive element coupled between the terminals of a DC input voltage, a rectifier coupled to the inductive element for supplying a DC output voltage to a load connected thereto, a control circuit for rendering the controllable switch alternately conducting and non-conducting, the voltage across the inductive element having a given polarity when the rectifier is conducting, a bistable switching element coupled to the control circuit for maintaining the controllable switch in its non-conducting state only during a time interval during which the voltage across the inductive element has said given polarity and which time interval immediately follows an interval of conductance of said switch, means for applying a set signal to a set input of the bistable switching element so as to bring said bistable switching element to a first state for maintaining the controllable switch non-conducting, and a threshold voltage detector coupled to the inductive element for applying a reset signal to a reset input of the bistable switching element so as to bring said bistable switching element to a second state for rendering and maintaining said controllable switch conducting, said threshold detector being operative when the voltage across the inductive element exceeds a predetermined threshold value.

2. A circuit as claimed in claim 1, wherein said set signal applying means comprises an OR gate for receiving the set signal and a signal of a minimum value detector for establishing that an output voltage of the circuit is not lower than a further predetermined value, an output of the OR gate being connected to the set input of the bistable element.

3. A circuit as claimed in claim 1, further comprising a sawtooth generator for generating a sawtooth-shaped signal during the interval of conductance of the controllable switch and for generating the set signal when the sawtooth-shaped signal exceeds a predetermined value.

4. A circuit as claimed in claim 3, wherein the sawtooth generator is connected to a winding coupled to the inductive element and through which winding a current flows during a same interval that a current flows through the inductive element.

5. A circuit as claimed in claim 3 wherein the sawtooth generator comprises a storage element and a charge source for the storage element, a delay element coupled between the threshold detector and said reset input for delaying the reset signal, the delayed reset signal for the bistable switching element also being a reset signal for the storage element.

6. A circuit as claimed in claim 1, further comprising adjustable delay element for delaying the reset signal applied to the reset input of the bistable switching element and coupled between the threshold voltage detector and said reset input.

7. A circuit as claimed in claim 1, wherein a plurality of windings is coupled to the inductive element, characterized in that the threshold voltage detector is connected to the winding having the largest number of turns.

8. A circuit as claimed in claim 1, further comprises an AND gate for receiving the reset signal for the bistable switching element and an output signal of said bistable switching element, and for passing on a signal for blocking the controllable switch.

9. A circuit as claimed in claim 8, comprising a control circuit for generating a control signal which is dependent on the output voltage for controlling the conductivity time of the controllable switch, and an OR gate for receiving the signal from the AND gate and the control signal and for passing on a signal for blocking the controllable switch.

10. A circuit as claimed in claim 9, further comprising a second OR gate for receiving the signal of the first OR gate and a signal for decreasing the output voltage, and for passing on a signal for blocking the controllable switch.

11. A switched-mode power supply circuit comprising a series arrangement of a controllable switch and an inductive element coupled between the terminals of a DC input voltage, a rectifier coupled to the inductive element for supplying a DC output voltage to a load connected thereto, a control circuit controlled by the load voltage for rendering the controllable switch alternately in a conducting state and a non-conducting state whereby the rectifier is conductive when the controllable switch is in the non-conducting state, and vice versa, the voltage across the inductive element having a given polarity during a flyback time interval when the rectifier is conducting, and a switching element controlled by the voltage across said inductive element and coupled to the control circuit for maintaining the controllable switch in its non-conducting state only during the flyback time interval and which flyback time interval immediately follows the conducting state of said controllable switch, the voltage of said inductive element reversing polarity subsequent to said flyback time interval thereby to control the switching element in a manner such that the switching element allows the controllable switch to conduct again.

12. A circuit as claimed in claim 1 wherein said switching element is controlled, at least in part, by a voltage induced in a first winding coupled to said inductive element.

13. A circuit as claimed in claim 12 wherein said switching element is further controlled by a voltage induced in a second winding coupled to said inductive element, said second winding having the same winding sense as said inductive element.

14. A circuit as claimed in claim 13 further comprising, a threshold voltage detector coupled to said first winding and to said switching element thereby to further control the switching element, and wherein said first winding has a larger number of turns than the second winding.

15. A circuit as claimed in claim 12 further comprising, a sawtooth generator coupled to said inductive element for generating a sawtooth signal during a conducting state of the controllable switch, and means for comparing said sawtooth signal with a signal determined by said first winding voltage thereby to derive a signal which will drive the switching element into a first state corresponding to the non-conducting state of the controllable switch.

16. A circuit as claimed in claim 15 further comprising, a threshold voltage detector coupled to said inductive element and via a delay element to said switching element, said threshold voltage detector being operative to apply a control signal to said switching element via the delay element to drive the switching element into a second state corresponding to the conducting state of the controllable switch when the voltage of the inductive element achieves a predetermined threshold value.

17. A circuit as claimed in claim 16 wherein the sawtooth generator comprises a storage element coupled to a source of electric energy and to a switching device, and wherein said switching device is responsive to said control signal to periodically discharge the storage element.

18. A circuit as claimed in claim 12 wherein said first winding and said inductive element are wound with an opposite winding sense, and said switching element has first and second state corresponding to the non-conducting state and the conducting state, respectively, of said controllable switch, said circuit further comprising, a threshold voltage detector coupled to said inductive element and via a delay element to said switching element, said threshold voltage detector being operative to apply a control signal to said switching element via the delay element to drive the switching element into its second state when the voltage of the inductive element achieves a predetermined threshold voltage.

19. A circuit as claimed in claim 11 which includes a function generator comprising:

a comparison device having a first input coupled to a reference voltage and a second input coupled to said inductive element, an adder circuit having a first input coupled to the inductive element and a second input coupled to a second reference voltage, a minimum value detector having a first input coupled to an output of the comparison device, a limiter circuit coupled between an output of the adder circuit and a second input of the minimum value detector, and means coupling an output of the minimum value detector to said switching element thereby to control said switching element.

* * * * *